US006883601B2

(12) United States Patent
Ullrich et al.

(10) Patent No.: US 6,883,601 B2
(45) Date of Patent: Apr. 26, 2005

(54) AIR CONDITIONER WITH INTERNAL HEAT EXCHANGER AND HEAT EXCHANGER TUBE THEREFOR

(75) Inventors: Holger Ullrich, Rastatt (DE); Bert Leisenheimer, Karlsruhe (DE)

(73) Assignee: Eaton Fluid Power GmbH (DE)

( * ) Notice: Subject to any disclaimer, the term of this patent is extended or adjusted under 35 U.S.C. 154(b) by 120 days.

(21) Appl. No.: 10/002,670

(22) Filed: Oct. 23, 2001

(65) Prior Publication Data

US 2002/0046830 A1 Apr. 25, 2002

(30) Foreign Application Priority Data

Oct. 25, 2000 (DE) ......................................... 100 53 000

(51) Int. Cl.[7] ................................................ F28F 1/00
(52) U.S. Cl. ...................................... 165/177; 165/179
(58) Field of Search ................................. 165/154, 177, 165/179

(56) References Cited

U.S. PATENT DOCUMENTS

| 3,887,004 | A | * | 6/1975 | Beck | 165/179 |
|---|---|---|---|---|---|
| 4,256,170 | A | * | 3/1981 | Crump | 165/154 |
| 4,345,644 | A | * | 8/1982 | Dankowski | 165/154 |
| 4,821,797 | A | * | 4/1989 | Allgauer et al. | 165/154 |
| 5,251,603 | A | * | 10/1993 | Watanabe et al. | 165/154 |
| 5,326,252 | A | * | 7/1994 | Tonon | 165/154 |
| 5,375,654 | A | * | 12/1994 | Hougland et al. | 165/154 |
| 6,070,657 | A | * | 6/2000 | Kunkel | 165/179 |

FOREIGN PATENT DOCUMENTS

JP          0339588      * 12/1998

* cited by examiner

Primary Examiner—Ljiljana Ciric
(74) Attorney, Agent, or Firm—Honigman Miller Schwartz and Cohn LLP

(57) ABSTRACT

An air-conditioning system for a motor vehicle contains a heat exchanger with a heat-exchanger tube that features a profiled central channel and outer channels grouped around the central channel. This heat-exchanger tube is suitable for the construction of counterflow heat exchangers. For this purpose, the heat-exchanger tube is to be cut to corresponding lengths and provided with corresponding end pieces. Such heat exchangers have proven to be light, pressure resistant, and effective.

6 Claims, 4 Drawing Sheets

AIR CONDITIONER WITH INTERNAL HEAT EXCHANGER AND HEAT EXCHANGER TUBE THEREFOR

Figure 1:
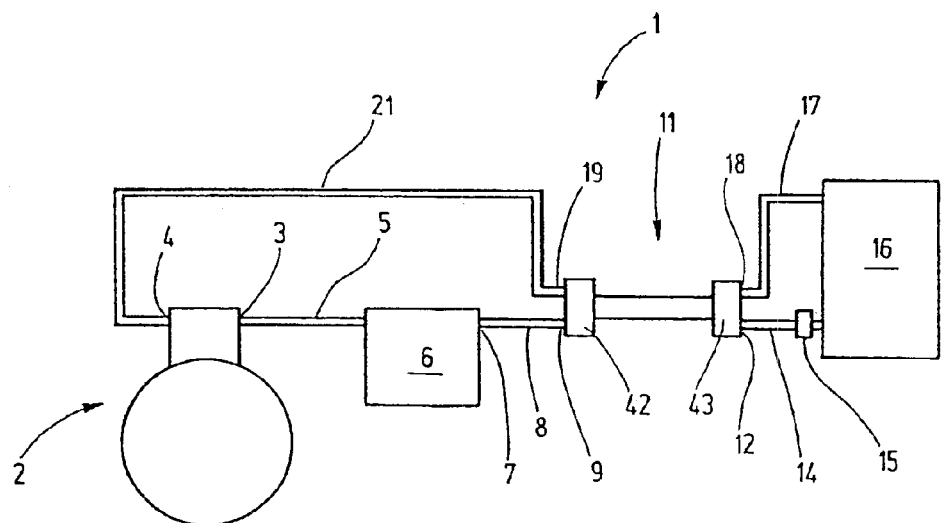

The invention pertains to a heat-exchanger tube, a heat exchanger equipped with such a heat-exchanger tube, as well as to an air-conditioning system with such a heat exchanger.

Air-conditioning systems, particularly air-conditioning systems of motor vehicles, usually include a refrigerating device that operates according to the principle of compression. The main components of such a compression-refrigerating device are a compressor, a gas cooler (or condenser), an expansion valve, an evaporator, and an internal heat exchanger for cooling the fluid guided to the expansion valve as a refrigerant, and for heating the expanded refrigerant leaving the evaporator in counterflow.

For some time, fluids that require a higher operating pressure have been proposed as alternatives to conventional refrigerants. For example, $CO_2$ is such a fluid. Such refrigerants require increased system pressure, wherein the systems must be designed for bursting pressures of up to 700 bar for reasons of safety.

The operation of a refrigerating device with a high operating pressure of over 60 bar is subject to special safety requirements in motor vehicles. In order for the system weight not to become too great, these requirements cannot be satisfied merely by reinforcing conventional components of an air-conditioning system without additional means. For motor vehicles, air-conditioning systems and refrigerating devices must be as light as possible. In addition, they must be constructed so that their production can be as economical and process-reliable as possible. These general requirements also apply to the internal heat exchanger of a motor vehicle air-conditioning system. Such a heat exchanger features two channels set together in the heat exchanger. In addition to the mentioned difficulties, there is the problem that the channels not only carry media of differing temperatures, but the channels are also exposed to differing pressures. The pressure differences between the two channels are considerable in high-pressure refrigerating devices. The pressures must not lead to damage to the heat exchanger. In addition, heat exchange that is as good as possible should be guaranteed. This can represent a special difficulty if supercritical pressures are reached, because then the liquid and gas phases of the refrigerant can no longer be distinguished. For such operating states, a desired heat exchange must also be guaranteed between the two channels.

Starting from here, the task of the invention is to create a pressure-resistant heat-exchanger element for a high-pressure air-conditioning system.

In addition, the task of the invention is to create a corresponding heat exchanger and also an air-conditioning system with such a heat exchanger.

This task is solved by the heat-exchanger tube with the features of claim 1.

The heat-exchanger tube according to the invention specifies a multiple-chamber profile with a central channel and with several outer channels grouped around the central channel. In this way, the central channel is arranged in the middle (centrally) in the heat-exchanger tube, i.e., the center line of the central channel coincides with the center line of the heat-exchanger tube. The outer channels are concentric to the central channel and separated from each other by partitions. The partitions extend approximately in the radial direction relative to the central channel or its center line. Thus, they act to reinforce the heat-exchanger tube and to form a particularly pressure-resistant central channel. For a channel diameter of approximately 5 mm, compression strengths of several 100 bar can be achieved for otherwise small wall thicknesses of the heat-exchanger tube, e.g., of 1–2 mm, and with aluminum as the material.

The central channel preferably features a shape deviating from a cylinder. Projections that extend into the central channel are formed on the walls of the central channel. The projections improve the heat exchange between the central channel and the outer channels in spite of the narrowing of the central channel created by the projections and the resulting increase in the flow rate, e.g., to 15 m/s.

For the preferred embodiment of the heat-exchanger tube, the cross-sectional surface of the central channel is clearly smaller than the sum of cross-sectional surfaces of the outer channels. In addition, the sum of the wall surface of the outer channels is considerably greater than the wall surface of the central channel. Subsequently, there is very good transfer between the liquid refrigerant in the central channel and the fluid in the outer channels. This is especially the case when the central channel is liquid or in a supercritical state while the fluid in the outer channels is in a vapor form.

It has proven advantageous if the number of partitions that separate the outer channels from each other is greater than the number of projections that extend into the central channel. This results in particularly high stability of the heat-exchanger tube and a high resistance to pressure. On the other hand, there is good heat exchange between the central channel and the outer channels. Preferably, the angle between adjacent partitions that border an outer channel is approximately 30°, i.e., there are 12 outer channels. However, deviations are possible. If necessary, somewhat fewer or even more outer channels can also be provided. The outer channels are preferably wedge-shaped, i.e., the sides of the partitions are parallel. In other words, the thickness of the partitions does not change in the radial direction, while the cross section of the outer channels increases from the interior towards the outside. The uniform wall thickness of the partitions optimizes the pressure resistance of the heat-exchanger tube. In addition, the pressure resistance is maintained by the large number of partitions that radiate outwards from the central channel. The partitions reinforce this central channel.

The dimensions of the outer channels in the circumferential direction are preferably narrower than the dimension in the radial direction. This also serves for reinforcing the profile while simultaneously improving the heat exchange.

The outer channels preferably feature uniform cross sections. In this way, application of pressure on the central channel and/or on the outer channels does not lead to asymmetric loading of the heat-exchanger tube. However, it is also possible for the outer channels to have different cross sections. This is especially the case, e.g., in order to further increase the heat exchange in the region of the projections of the central channel.

The central channel features a cross section deviating from a circle. This measure enables an improvement of the heat exchange, particularly for very narrow channel cross sections. Narrow cross sections enable a large pressure resistance already for small wall thicknesses and thus a particularly weight-saving method of construction. Thus, the heat-exchanger tube is suitable for the construction of a heat exchanger for a high-pressure refrigerating device of an air-conditioning system of a motor vehicle.

The central channel can be narrowed, e.g., by four opposing projections arranged in pairs. Then it features a cross-shaped cross section, which has proven to be advantageous. The projections then have approximately triangular cross sections, wherein they are preferably rounded on their side facing the center of the channel. The rounding radius is preferably chosen to be relatively large and is approximately in the range of the height of each projection. Thus, the projections are bounded towards the interior of the central channel by approximate circular arc shapes.

The projections are preferably formed as ribs that extend in the axial direction, i.e., without twisting along the central channel. Thus, the ribs are formed straight. Relative to a heat-exchanger tube with a smooth central channel, the ribs reduce the heat-exchanger tube by approximately 15%. As a total improvement, in comparison with a multiple-chamber profile with 6 outer channels and a circular central channel, an improvement in heat exchange of 40–50% can be achieved.

The design with straight ribs extending in the axial direction can be manufactured as an extruded part, e.g., as an aluminum extruded part. In spite of the welding lines produced during extrusion where the extrusion material flows together, the desired pressure resistance can be achieved without difficulty. AlMgSi O,5F22 can be used as the material.

If necessary, the ribs can also be designed with a spiral shape. This has the advantage of an even better heat exchange and thus a potential reduction of the heat-exchanger tube. Such a heat-exchanger tube can be produced by extrusion with the product being later twisted. This can be done with constant pitch or also with a pitch that changes by section. The ribs can also be arranged, e.g., in a zigzag shape.

A heat exchanger that uses the heat-exchanger tube according to the invention is particularly suited for use as an internal heat exchanger for high-pressure refrigerating devices for air-conditioning systems of motor vehicles. In this way, the heat-exchanger tube can be used as a heat exchanger in an elongated shape, bent in a U shape, and also in wound shapes, e.g., spiral or helical shapes. The symmetrical profile and the numerous reinforcing partitions ensure that neither pressure changes nor temperature changes lead to significant deformations of such a heat exchanger. The inflow and outflow of fluids into the central channel and into the outer channels, and out of these channels, respectively, is realized with corresponding connecting pieces that distribute the arriving fluid between the outer channels and that recombine the fluid leaving the outer channels. In addition, the connecting pieces supply separate fluid to the central channel and again guide the fluid separately out of this channel. Thus, the connecting pieces are provided with means that distribute the fluid provided for the outer channels uniformly between the outer channels and that uniformly receive the fluid from these channels, respectively. A conical pre-chamber with one, two, or more feeding holes (manifold) can be used for this purpose. Alternatively, a twisting chamber can be provided that contains means for generating twists, so that the fluid fed to the outer channels has rotational motion about the longitudinal axis of the heat-exchanger tube. This method can realize a very small loss of pressure $\Delta p$ of 2 bar and less.

In preferred embodiments, the connecting pieces at both ends of the heat-exchanger tube are designed identically. This has advantages for manufacturing techniques.

For a corresponding air-conditioning system, the heat exchanger according to the invention is preferably used as an internal heat exchanger, wherein it produces heat exchange between the fluid entering the evaporator and the fluid leaving the heat exchanger. This is preferably done in counterflow. In this way, the central channel preferably guides liquid or fluid in a supercritical state supplied under high pressure to the expansion valve, while the outer channels preferably guide the low-pressure gaseous fluid leaving the evaporator. For the fundamental design according to the invention, which includes a profiled central channel, the central channel can be realized to be pressure resistant without additional means. This particularly applies when more than six partitions are provided in the region of the outer channels, as also provided by the invention. These partitions produce improved heat exchange and also improved reinforcement of the heat exchanger and thus increased pressure resistance of the central channel. Also, the outer diameter relative to the heat-exchanger tubes with merely six outer channels can be reduced, which has advantages relative to weight and pressure resistance.

Advantageous features of the invention can be gathered from the drawing, the description, or the subordinate claims.

Figure 2:
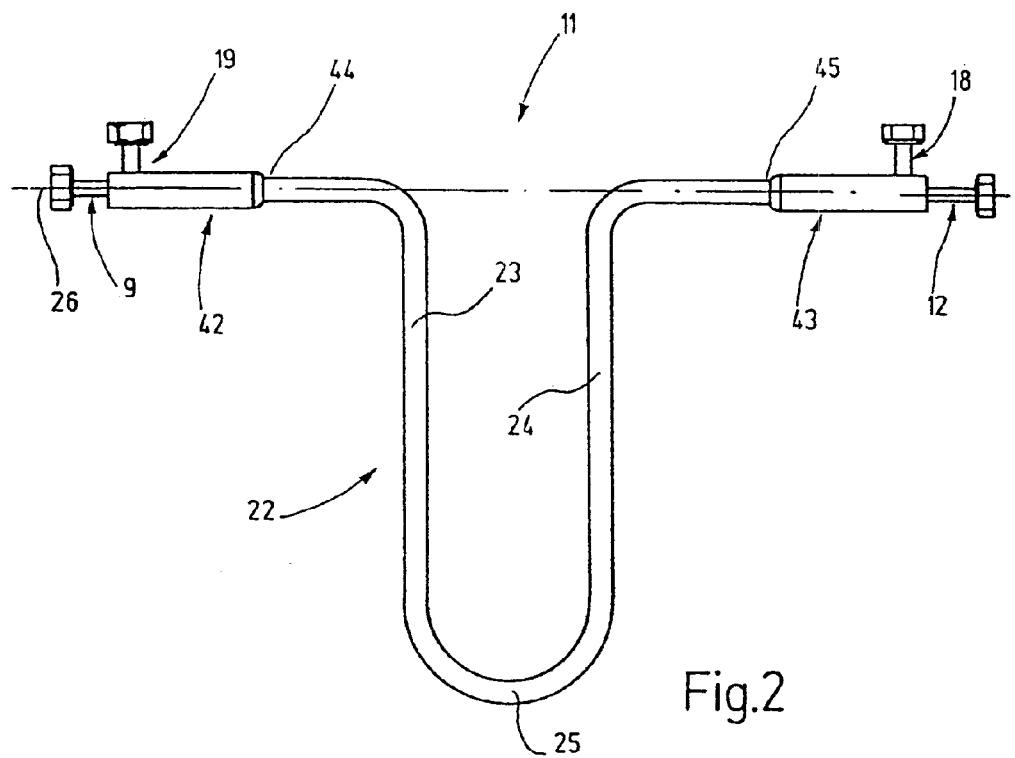
Figure 3:
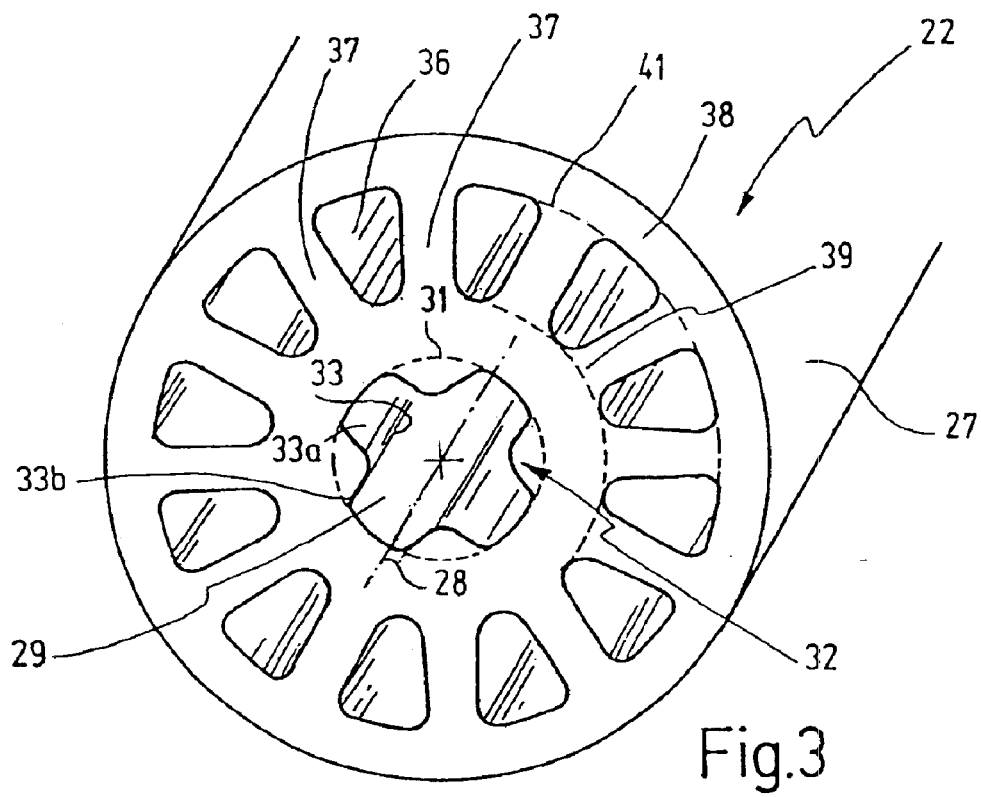
Figure 4:
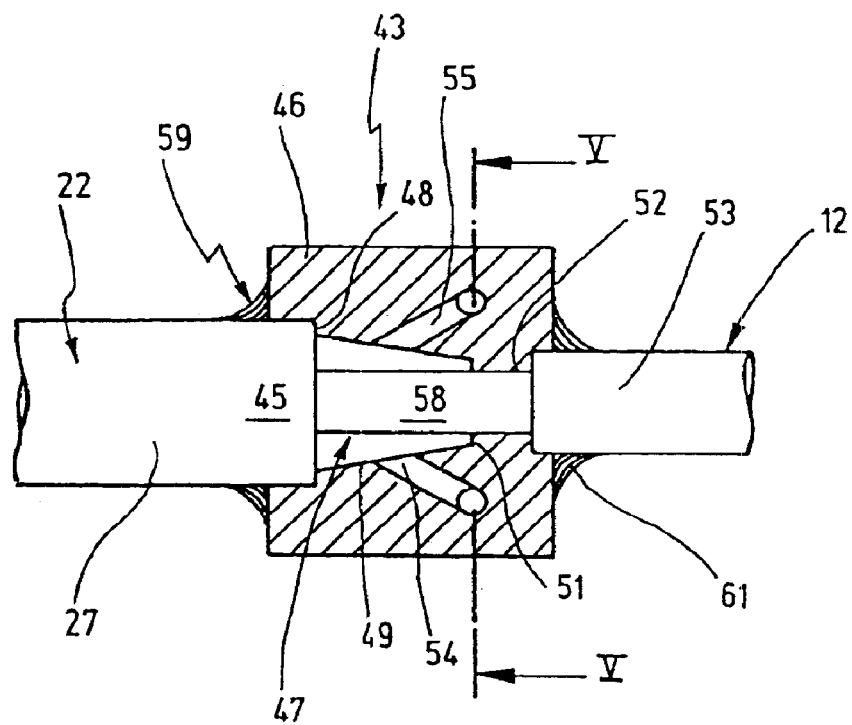
Figure 5:
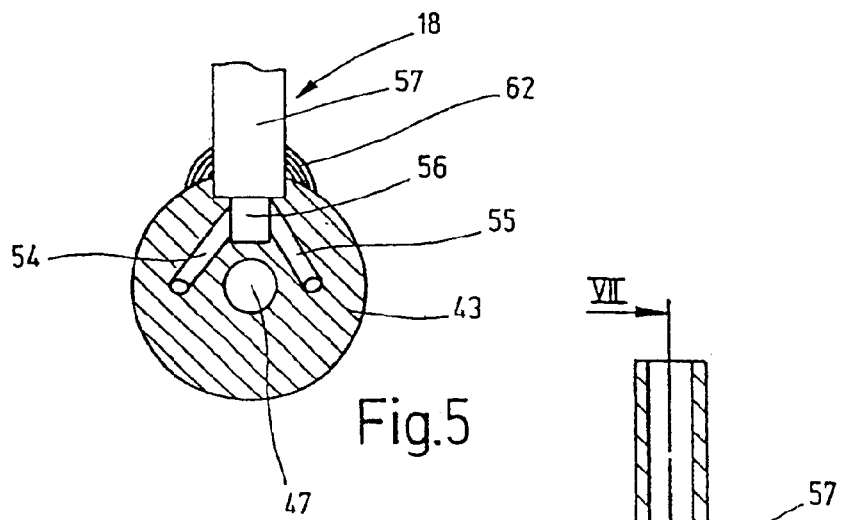
Figure 6:
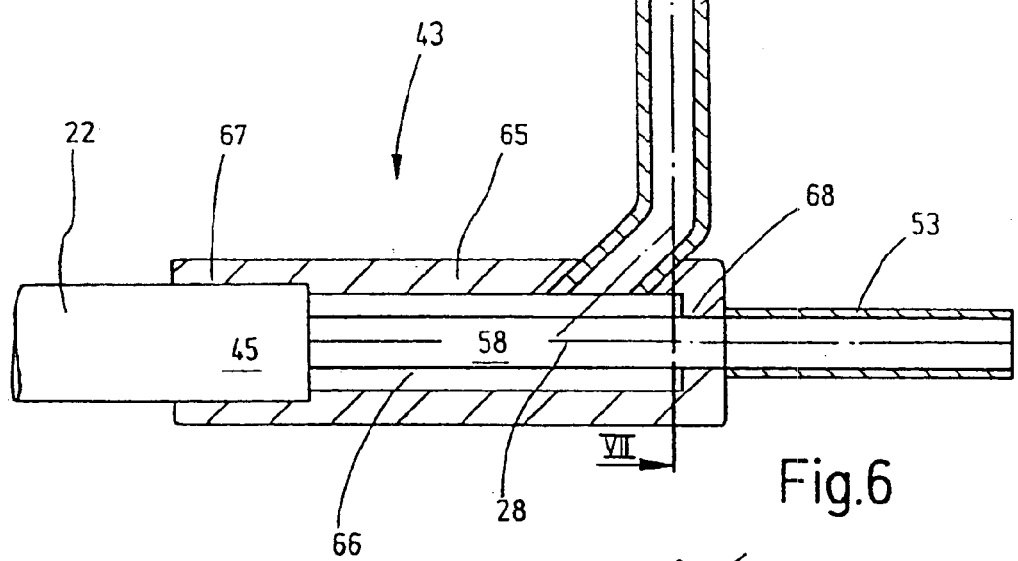
Figure 7:
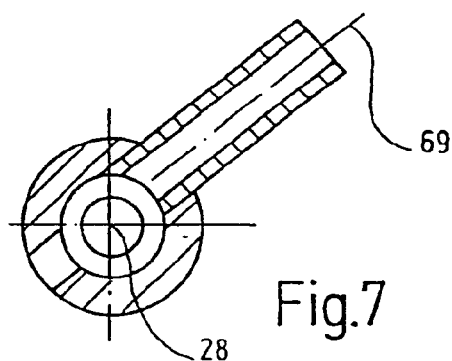
Figure 8:
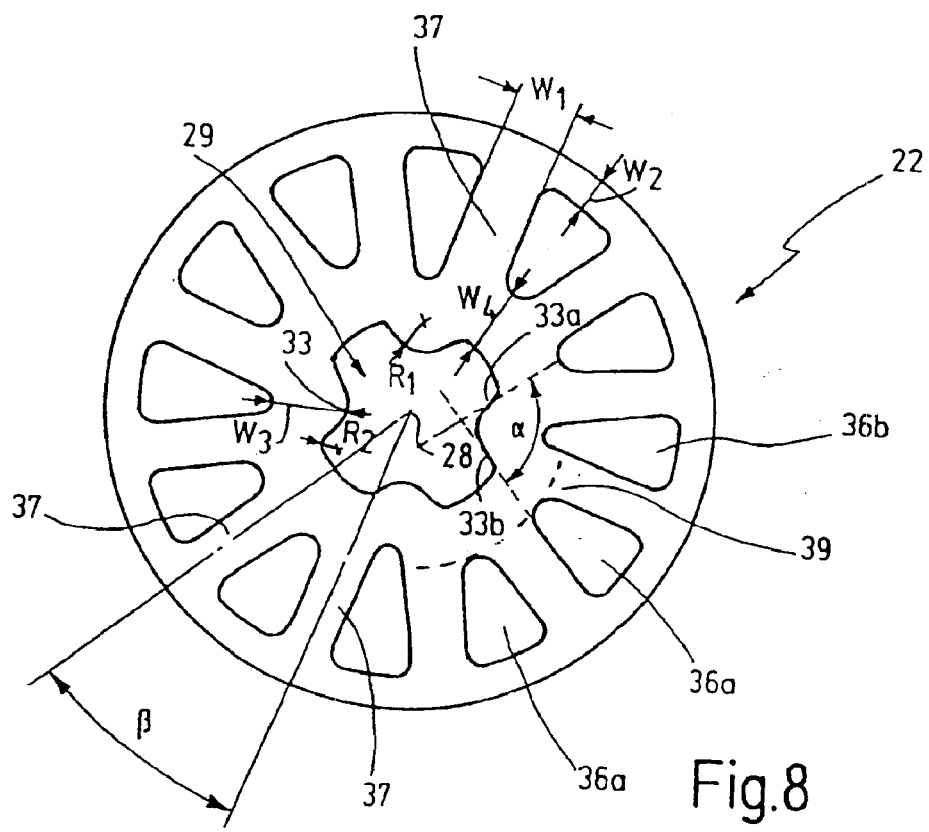
Figure 9:
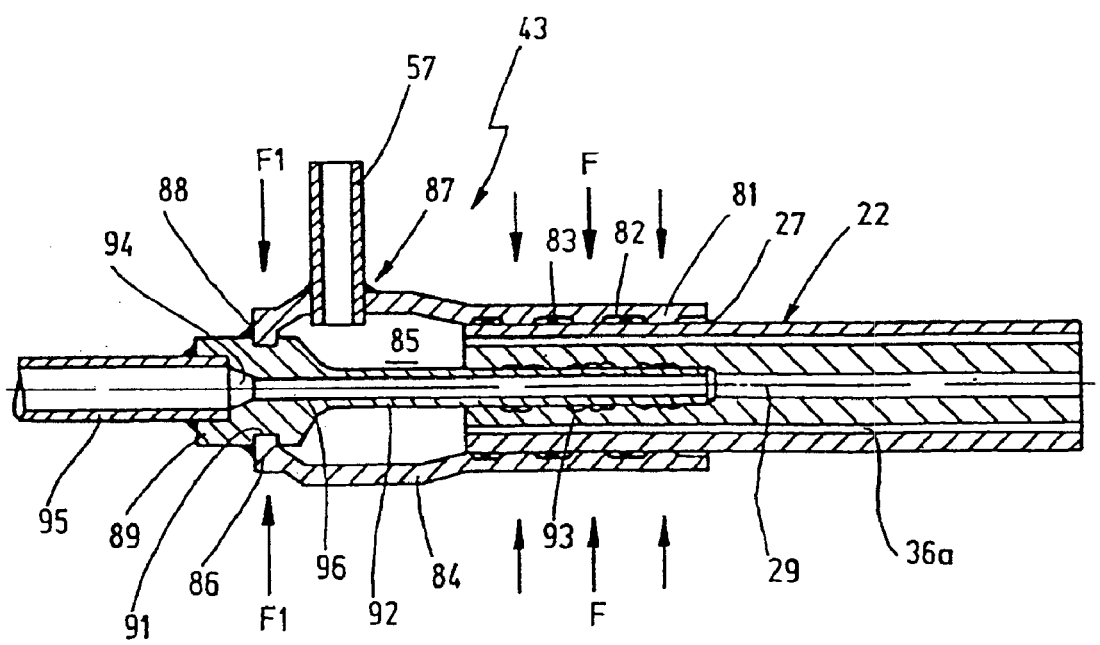

Embodiments of the invention are illustrated in the drawing. Shown are:

FIG. 1, a motor-vehicle air-conditioning system in a schematic diagram,

FIG. 2, an internal heat exchanger of the motor vehicle air-conditioning system from FIG. 1, in side view, FIG. 3, a heat-exchanger tube for the heat exchanger from FIG. 2, in a perspective sectional representation, FIG. 4, the heat exchanger from FIG. 2, in a sectional and partially cutaway representation, FIG. 5, the heat exchanger from FIG. 2, cut along line V—V in FIG. 4, FIG. 6, an alternative embodiment of a heat exchanger with twisting chamber connecting pieces, in sectional and partially cutaway representation, FIG. 7, the heat exchanger from FIG. 6, cut along the line VII—VII in FIG. 6, FIG. 8, an alternative embodiment of a heat-exchanger tube, in schematic sectional representation, and FIG. 9, an alternative embodiment of a heat exchanger with attached connecting pieces, in sectional and partially cutaway representation.

A refrigerating device 1 for motor vehicles is illustrated in FIG. 1. A compressor 2 that is driven, e.g., by the engine of the motor vehicle belongs to the refrigerating device 1. The compressor 2 features an output 3 and an input 4. While gaseous fluid is input at the input 4, compressed fluid is output at the output 3. From the output 3, a pressure line 5 leads to a condenser 6, in which the compressed heat-carrier fluid (e.g., $CO_2$, propane, butane, R134a, or ammonia) is refrigerated and/or condensed. The refrigerated heat-carrier fluid at a high pressure (e.g., between 100 bar and 150 bar for $CO_2$) is output at an output 7 of the condenser 6 to another pressure line 8 that leads to a high-pressure input 9 of heat exchanger 11. This heat exchanger features a high-pressure output 12, to which an expansion valve 15 is connected by means of a pressure line 14. This leads to expansion of the heat-carrier fluid that is fed into an evaporator 16. Here, the fluid evaporates by receiving heat from the surroundings, e.g., in order to cool air in an air-conditioning system. From the evaporator 16, the resulting cold vapor of the heat-carrier fluid is led through a low-pressure line 17 to a low-pressure input 18 of the heat exchanger 11. The fluid flows through this in counterflow to the fluid fed through the high-pressure input 9. In this way, the fluid passes in heat exchange with the latter [fluid] and the fluid is delivered heated at a low-pressure output 19. From this it is fed through a low-pressure line 21 to the input 4 of the compressor 2.

The heat exchanger 11 is illustrated separately in FIG. 2. It features a heat-exchanger tube 22 that can be formed individually and that is bent in a U shape in the present embodiment. It features two straight legs 23, 24 that are parallel and separated from each other, and that are connected to each other by an arc-shaped section 25. The ends of the two legs 23, 24 are each bent away flush relative to each other, i.e., coaxial to a common axis 26.

The heat-exchanger tube 22 is a multiple-chamber aluminum profile manufactured in an extrusion process. It is shown separately in FIG. 3 for illustrating its cross section. The heat-exchanger tube 22 features a preferably cylindrical outer jacket surface 27 that is arranged coaxial to a longitudinal center axis 28. Likewise, a central channel 29 that features a cross section deviating from a circle is provided coaxial to the longitudinal center axis 28. In the present embodiment, i.e., for an air-conditioning system with $CO_2$ as the refrigerant (heat-carrier fluid), an outer diameter of the central channel 29 of 5–6 mm is advantageous. This diameter is indicated in FIG. 3 by a dashed line 31. Starting at this diameter, the central channel 29 is narrowed by four projections 32 that are arranged opposite each other in pairs in this embodiment. If necessary, however, also more (e.g., five or six) or fewer (e.g., merely two or three) projections 32 can be provided.

The projections 32 form longitudinal ribs 33 that extend parallel to the longitudinal center axis 28. The ends of the ribs 33 pointing to the longitudinal center axis 28 are rounded, wherein the rounding radius lies approximately on the order of magnitude of the height of each rib (measured from the dashed line 31). If the radius is somewhat smaller, then the longitudinal ribs 33 each have an approximately triangular cross section with a preferably right angle between the two sides 33a, 33b bounding the ribs 33. If the sides 33a, 33b are not flat but rounded, then the angle between the tangents at the sides 33a, 33b is approximately 90°.

The heat-exchanger tube 22 is designed in one piece and features several outer channels 36. In the embodiment according to FIG. 3, the outer channels 36 are designed identical to each other. There are at least seven, but preferably more outer channels 36. Preferably, there are twelve outer channels with approximately wedge-shaped cross sections, as can be seen in FIG. 3. The outer channels 36 are separated from each other by partitions 37, wherein the angle between two partitions 37 is approximately 30°. The partitions 37 extend approximately parallel to the longitudinal center axis 28 and also radial to this axis. They feature a wall thickness that is constant in both the longitudinal direction and also in the radial direction. In this present embodiment, this thickness is approximately 1–1.5 mm and is smaller than the center width of an outer channel 36. Towards the outside, the outer channels 36 are closed by a wall section 38, whose thickness is approximately the same as the thickness of a partition 37 and is approximately 1 mm.

The outer channels 36 are equidistant to each other and are arranged on a circle that is coaxial to the longitudinal center axis 28. Their radial inner end is at a distance from the line 31 to an extent that is greater than the thickness of a partition. In the present case, the distance is approximately 1.5 mm. In this way, a sufficient wall thickness is created between the central channel 29 and the outer channels 36 in order to guarantee high pressure resistance of the central channel 29.

While the central channel 29 is designed with an approximately star or cross shape, the outer channels 36 are designed with approximately wedge shapes, wherein all channels 29, 36 feature rounded edges. The wall segments of the central channel 29 with the largest diameter touch the circle designated by the line 31, while the inner wall segments of the outer channels 36 touch a circle designated by the line 39 and the outer wall segments of the outer channels touch a circle designated by the line 41.

The heat-exchanger tube 22 is an essential component of the pressure-resistant heat exchanger 11. As can be seen from FIG. 2, this heat exchanger also includes connecting pieces 42, 43 that are attached to the two ends 44, 45 of the heat-exchanger tube 22, where the high-pressure input 9, the high-pressure output 12, the low-pressure input 18, and the low-pressure output 19 are arranged. The two connecting pieces 42, 43 are preferably designed identical to each other. Thus, the following description of the connecting piece 43 applies to the connecting piece 42.

As can be seen from FIG. 4, the connecting piece 43 features an approximately cylindrical element 46 that is provided with an opening 47 for receiving the end 45 of the heat-exchanger tube 22. Initially, the opening 47 is cylindrical, with a diameter that is approximately the same as the diameter of the jacket surface 27 of the heat-exchanger tube 22 or that is slightly larger than this. This cylindrical section of the opening 47 transitions at an annular shoulder 48 into a conical section 49, in which the diameter of the opening 47 decreases in the direction away from the end 45. At a transition point 51, the opening 47, in turn, transitions into a cylindrical section 52. For receiving a corresponding connecting piece 53, e.g., forming the high-pressure output 12, the cylindrical section 52 then expands again to a slightly larger diameter.

With its conical section 49, the opening 47 forms a collection chamber, into which opens one or more, in the present embodiment two, diametrically opposite channels 54, 55. As can be seen particularly from FIG. 5, these channels 54, 55 lie opposite each other and open into the conical walls of the opening 47. The channels 54, 55 join in a radially positioned side chamber 56 that is connected to a tubular connecting piece 57, e.g., forming the low-pressure input 18.

For connecting the end 45 of the heat-exchanger tube 22, the outer wall section 38, as well as the partitions 37, are removed from a short section of its end 45, so that merely a tubular piece 58 remains surrounding the central channel 29. This passes through the opening 47 and projects into the section 52 of the opening 47, when the end 45 is inserted into the opening 47. This is illustrated in FIG. 4. In addition, it can be seen from FIG. 4 that the heat-exchanger tube 22 is welded to the connecting piece 43 by a corresponding welding seam 59. Likewise, the connecting piece 53 is welded to the connecting piece 43 by means of a welding seam 61. The connecting piece 57 is welded to the connecting piece 43 by means of a welding seam 62, which follows from FIG. 5.

Instead of a welding connection, also a solder connection or with sufficient dimensions, an adhesive connection can also be provided. The piece 58 can be seated in the section 52 of the connecting piece 43 by force fit. Here, an absolutely fluid-tight seal must also be produced because even insignificant leakage between the central channel 29 and the outer channels 36 is not permissible. If this [seal] is not sufficient, here a solder or welding connection, or alternatively, an adhesive connection or press-fit connection can be provided, and/or a sealing means, such as, e.g., an O-ring, can be inserted.

The refrigerating device 1 described so far operates as follows:

In operation, the compressor 2 compresses vapor removed from the evaporator 16. This [vapor from the evaporator] is fed through the low-pressure line 17 to the heat exchanger 11. Here, it is initially led by means of low-pressure input 18 into the channels 54, 55 in equal parts. This feeds the vapor to the conical chamber of the opening 47 at two diametrically opposite sides, so that this chamber is uniformly filled. The vapor introduced into the chamber can be distributed uniformly and with equal pressure to all twelve outer channels 36 to flow through the heat exchanger 11. At the opposing connecting piece 42, the vapor heated in the heat exchanger 11 is output from the outer channels 36 and input into a corresponding conical chamber. From this chamber, the heated vapor is fed through the two channels 54, 55, in turn, to the low-pressure output 19. From here, the somewhat heated vapor is output to the compressor 22. After compression and cooling of the refrigerant, this is fed, in turn, to the high-pressure input 9. This is arranged coaxial to the central channel 29. The refrigerant is fed directly to the central channel and in counterflow to the outer channels 36. Here, the heat-carrier fluid flowing through the central channel 29 gives part of its existing heat to the heat-exchanger tube 22, which transfers the heat to the colder fluid flowing in counterflow through the outer channels 36.

The described heat exchanger 11 can be manufactured to be pressure resistant and effective in an economical manner and with minimum use of material and weight in large dimensions. Thus, it is especially suited for use in motor vehicles.

Each of the connecting pieces 42, 43 has the task of connecting the essentially radial low-pressure connections (low-pressure input 18, low-pressure output 19) to the outer channels 36 such that the inflow or outflow fluid is uniformly divided between the outer channels 36. In addition, the essentially axial connections (high-pressure input 9, high-pressure output 12) must be connected to the central channel 29. The connecting piece 43, which is illustrated in FIG. 6 and which also represents both connecting pieces 42, 43, is suitable for this purpose. It features a cylindrical element 65 that surrounds a cylindrical chamber 66. This features an opening 67 with enlarged diameter at one end and at the opposing end it features an opening 68 with smaller diameter. The end 45 of the heat-exchanger tube 22 projects into the opening 67 and is fixed in a sealed manner. Solder or welding connections, adhesive connections or force-fit connections, supported by sealing means, such as, e.g., O-rings, can be used for this purpose.

The piece 58 of the heat-exchanger tube 22 extends through the chamber 66 into the opening 68. Here, it is held in a sealed manner, e.g., through solder, welding, or adhesive connections or by a force fit. In addition, the tube-shaped connecting piece 53 is connected to the opening 68.

While for the embodiment of the connecting piece 42, 43 according to FIGS. 4 and 5, a conical chamber with at least two opposing inlets or outlets (channels 54, 55) is provided for uniform distribution of the heat-carrier fluid to the outer channels 36, for the embodiment according to FIGS. 6 and 7 for equalizing the distribution of the fluid, a rotational or whirling motion of the fluid in the chamber 6b [sic; 66] is generated. In order to induce this motion, the tube-shaped connecting piece 57 is attached to the chamber 66 such that its tube center axis 69 does not intersect the longitudinal axis 28 of the connecting piece 43 and the heat-exchanger tube 22. The distance between the tube center axis 69 and the longitudinal center axis 28 is smaller than the outer diameter of the piece 58 in order not to generate too strong a vortex buildup. In addition, the connecting piece 57 in the region of its opening into the chamber 66 is somewhat inclined against the radial direction; in the embodiment according to FIG. 6, approximately by 40–50°.

A modified embodiment of the heat-exchanger tube 22 is illustrated in FIG. 8. As with the previously described embodiment, the sides 33a, 33b form an angle α of approximately 90°. The longitudinal ribs 33 are rounded on their side facing the longitudinal center axis 28 with a radius R1 that is approximately on the order of magnitude of the height of each longitudinal rib 33 or is slightly greater than this. Likewise, the transitions between the longitudinal ribs 33 and the remaining regions of the walls of the central channel 29 are rounded with a radius R2 that, however, is clearly smaller than the radius R1. The angle β between adjacent partitions 37 is uniformly 30° and the wall thickness for each of the partitions 37 is somewhat greater (1.2 mm) than the wall thickness W2 of the outer wall (1 mm).

However, deviating from the previously described embodiment, the cross sections of the outer channels 36 are not completely uniform. Eight outer channels 36a extend up to the circle marked by the dashed line 39, which is arranged concentric to the longitudinal axis 28. However, four outer channels 36b each arranged in the region of a longitudinal rib 33 extend beyond this circle further inwards. In this region W3, a wall thickness is achieved that is approximately the wall thickness W4 between the central channel 28 [sic; 29] and the smaller outer channels 36a.

The connection of the heat-exchanger tube 22 is schematically illustrated in FIGS. 4–7. In comparison, an especially advantageous embodiment of the heat-exchanger tube connection is illustrated in FIG. 9. The heat-exchanger tube 22 is gripped at its end 45 in a tube-shaped extension 81 of the connecting piece 43 that is sealed on the jacket surface 27 of the heat-exchanger tube. For mechanical fixing, a press-fit connection is used, which is achieved through radial compression of the extension 81. This is indicated in FIG. 9 by the arrows F.

In the extension 81, one or more annular grooves 82 are formed that are each used to preferably receive one elastomer O-ring 83 that is used as a sealing element. O-rings are preferred due to their elasticity (vibrational resistance). However, other elements also come into consideration as sealing elements, such as, e.g., cutting rings that cut into the extension 81 and into the jacket surface 27 and produce a pure metallic seal (insensitivity against fluids). It is also possible to combine cutting rings and O-rings, e.g., in that an annular groove 82 contains an elastomer O-ring and another annular groove contains a metallic cutting ring.

A section 84 with a slightly larger diameter or a diameter not reduced by radial compression connects to the extension 81. This section surrounds an inlet or outlet chamber 85 and is closed on its end by a front wall 86. A wall of the chamber 85 is perforated on the side by an opening 87, in which the connecting tube 57 is soldered or welded.

The front wall 86 is likewise provided with an opening 88 in which a connection base 89 sits. This features a cylindrical basic element, whose jacket surface is provided with an annular groove 91. The front wall 86 fits at the edges of its opening 88 into the annular groove. This is achieved because the opening 88 is initially produced with a diameter that is greater than the diameter of the basic element. In a radial compression step, the opening 88 is then reduced by a force impressed in the direction of the arrows F1. For sealing and additional fixing, the front wall 86 is then welded to the connection base 89 or connected by some other form-fit connection.

From the connection base 89, a tubular needle 92 (tube-shaped extension) extends into the central channel 29. In this way, the ribs 33 are removed and the central channel 29 is cylindrical at least in the region, through which the tubular needle 92 extends into the central channel 29. The tubular needle 92 is provided on its outer side with annular metal ribs 93 that are used as sealing elements. With radial pressure (forces F), these metal ribs press into the wall of the central channel and produce a metallic sealing. The metal ribs 93 can be designed in one piece with the tubular needle 92. Alternatively, O-rings or other sealing elements can also be provided.

The connection base 89 features a connection opening 94 for connecting the central channel 29. This opening connects to the channel surrounded by the tubular needle 92, but here it features a greater diameter. A tube end 95 is inserted into this connection opening and is welded or alternatively, connected in another manner to the connection base 89.

The connection base 89 forms a two-part connecting piece with the outer tube part (section 84 and extension 81). In the chamber 85, the connection base 89 features a concave annular deflection surface 96 that transitions into the tubular needle 92 and that deflects a flow from the radial direction into the axial direction (or vice versa). This deflection surface reduces flow detriment and in connection with the annular chamber 85, whose length is slightly greater than its diameter, produces a uniform distribution of the flow to the channels 36a or a uniform flow reception from these channels 36a.

An air-conditioning system for a motor vehicle contains a heat exchanger 11 with a heat-exchanger tube 22 that features a profiled central channel 29 and outer channels 36 grouped around the central channel. This heat-exchanger tube 22 is suitable for the construction of counterflow heat exchangers. For this purpose, the heat-exchanger tube 22 is to be cut to corresponding lengths and provided with corresponding end pieces 42, 43. Such heat exchangers have proven to be light, pressure resistant, and effective.

What is claimed is:

1. A heat-exchanger comprising:
   a heat-exchanger tube that includes a central channel having an inner wall from which a plurality of projections extend into the central channel and a plurality of outer channels that are arranged concentric to the central channel and that are separated from each other by partitions,
   wherein the heat-exchanger tube includes two ends that are each connected to a connecting piece having a collection chamber that combines all outer channels into one channel,
   wherein the connecting pieces include a means for uniformly distributing a fluid stream between the outer channels or for uniformly combining a fluid stream arriving from the outer channels; and
   wherein the means for uniformly distributing or combining the fluid stream is a twisting chamber.

2. The heat-exchanger according to claim 1, wherein the connecting pieces on both ends of the heat-exchanger tube are substantially similar to each other.

3. The heat-exchanger according to claim 1, wherein the connecting pieces are connected to the heat-exchanger tube by a press-fit connection.

4. The heat-exchanger according to claim 1, wherein the press-fit connection is a press-fit connection produced through plastic deformation of the connecting pieces.

5. A heat-exchanger comprising:
   a heat-exchanger tube that includes a central channel having an inner wall from which a plurality of projections extend into the central channel and a plurality of outer channels that are arranged concentric to the central channel and that are separated from each other by partitions,
   wherein the heat-exchanger tube includes two ends that are each connected to a connecting piece having a collection chamber that combines all outer channels into one channel,
   wherein the connecting pieces include a means for uniformly distributing a fluid stream between the outer channels or for uniformly combining a fluid stream arriving from the outer channels;
   wherein the means for uniformly distributing or combining the fluid stream is a twisting chamber; and
   wherein the twisting chamber exhibits a substantially cylindrical cross section.

6. A heat-exchanger comprising:
   a heat-exchanger tube that includes a central channel having an inner wall from which a plurality of projections extend into the central channel and a plurality of outer channels that are arranged concentric to the central channel and that are separated from each other by partitions,
   wherein the heat-exchanger tube includes two ends that are each connected to a connecting piece having a collection chamber that combines all outer channels into one channel,
   wherein the connecting pieces include a means for uniformly distributing a fluid stream between the outer channels or for uniformly combining a fluid stream arriving from the outer channels;
   wherein the means for uniformly distributing or combining the fluid stream is a twisting chamber;
   wherein the twisting chamber exhibits a substantially cylindrical cross section; and
   wherein the twisting chamber includes a connection having a longitudinal axis that does not intersect a longitudinal axis of the connecting piece.

* * * * *